(12) United States Patent
Kanna

(10) Patent No.: US 9,894,291 B2
(45) Date of Patent: Feb. 13, 2018

(54) STILL IMAGE PROVISION DEVICE

(71) Applicant: NEC CORPORATION, Tokyo (JP)

(72) Inventor: Yoshihiro Kanna, Tokyo (JP)

(73) Assignee: NEC CORPORATION, Tokyo (JP)

( * ) Notice: Subject to any disclaimer, the term of this patent is extended or adjusted under 35 U.S.C. 154(b) by 619 days.

(21) Appl. No.: 14/458,809

(22) Filed: Aug. 13, 2014

(65) Prior Publication Data
US 2015/0085194 A1    Mar. 26, 2015

(30) Foreign Application Priority Data
Aug. 13, 2013    (JP) ................................ 2013-168125

(51) Int. Cl.
*H04N 5/262*    (2006.01)
*H04N 5/91*    (2006.01)
*H04N 9/87*    (2006.01)

(52) U.S. Cl.
CPC ............... *H04N 5/262* (2013.01); *H04N 5/91* (2013.01); *H04N 9/87* (2013.01)

(58) Field of Classification Search
CPC combination set(s) only.
See application file for complete search history.

(56) References Cited

U.S. PATENT DOCUMENTS

| 6,573,907 B1 * | 6/2003 | Madrane | G06F 17/30787 |
| | | | 707/E17.028 |
| 6,771,268 B1 * | 8/2004 | Crinon | G06F 17/30799 |
| | | | 345/475 |
| 7,423,670 B2 | 9/2008 | Kawai et al. | |
| RE42,728 E * | 9/2011 | Madrane | G06F 17/3079 |
| | | | 715/716 |
| 8,538,238 B2 | 9/2013 | Hosokawa | |
| 9,491,368 B2 * | 11/2016 | Harada | G06F 17/3082 |
| 2004/0194134 A1 * | 9/2004 | Gunatilake | H04N 5/50 |
| | | | 725/38 |

(Continued)

FOREIGN PATENT DOCUMENTS

| JP | 2004-120252 | 4/2004 |
| JP | 2007-259128 | 10/2007 |

(Continued)

OTHER PUBLICATIONS

Japanese Office Action dated Jul. 11, 2017 in corresponding Japanese Patent Application No. 2013-168125.

*Primary Examiner* — Tsung-Yin Tsai
(74) *Attorney, Agent, or Firm* — Young & Thompson

(57) ABSTRACT

A moving image acquiring part acquires a moving image. A still image accumulating part stores still images. An image processing part calculates gains obtained by previously storing based on the costs of extraction of still images from a moving image, and extracts some still images with higher gains from among the still images composing the moving image and stores into the still image accumulating part. A request processing part retrieves a still image requested by a request source from the still image accumulating part and transmits to the request source and, when the still image requested by the request source is not stored in the still image accumulating part, extracts the still image requested by the request source from the moving image acquired by the moving image acquiring part and transmits to the request source.

19 Claims, 19 Drawing Sheets

(56) References Cited

U.S. PATENT DOCUMENTS

| | | | | |
|---|---|---|---|---|
| 2007/0128899 A1* | 6/2007 | Mayer | .................... | G06F 9/4406 |
| | | | | 439/152 |
| 2007/0136533 A1* | 6/2007 | Church | .............. | G06Q 30/0277 |
| | | | | 711/137 |
| 2009/0119454 A1* | 5/2009 | Brooks | .................. | H04N 19/61 |
| | | | | 711/118 |
| 2011/0293195 A1* | 12/2011 | Nakagami | .............. | H04N 19/61 |
| | | | | 382/233 |
| 2012/0023226 A1* | 1/2012 | Petersen | ............... | H04W 4/028 |
| | | | | 709/224 |
| 2013/0054729 A1* | 2/2013 | Jaiswal | ................... | H04W 4/02 |
| | | | | 709/213 |
| 2014/0011538 A1* | 1/2014 | Mulcahy | ............. | H04L 67/2842 |
| | | | | 455/553.1 |
| 2014/0342730 A1* | 11/2014 | Mulcahy | ............. | H04L 67/2847 |
| | | | | 455/426.1 |
| 2014/0342772 A1* | 11/2014 | Mulcahy | ............... | H04W 88/06 |
| | | | | 455/553.1 |
| 2016/0358312 A1* | 12/2016 | Kolb | ....................... | G06T 5/003 |

FOREIGN PATENT DOCUMENTS

| | | | | |
|---|---|---|---|---|
| JP | 2009-187155 | | 8/2009 | |
| JP | 2009-194491 | | 8/2009 | |
| JP | 2011-259320 | | 12/2011 | |
| JP | 2013-090194 A | | 5/2013 | |
| JP | 2015037236 A | * | 2/2015 | ............. H04N 5/262 |

* cited by examiner

FIG. 10A

| FRAME NUMBER | STILL IMAGE EXTRACTION CALCULATION AMOUNT |
|---|---|
| 1 | 0.10 |
| 2 | 0.12 |
| 3 | 0.14 |
| 4 | 0.16 |
| 5 | 0.18 |
| 6 | 0.20 |
| 7 | 0.22 |
| 8 | 0.24 |
| 9 | 0.26 |
| 10 | 0.28 |
| 11 | 0.30 |
| 12 | 0.32 |
| 13 | 0.34 |
| 14 | 0.36 |
| 15 | 0.38 |
| 16 | 0.40 |
| 17 | 0.42 |
| 18 | 0.44 |
| 19 | 0.46 |
| 20 | 0.48 |
| 21 | 0.50 |
| 22 | 0.52 |
| 23 | 0.54 |
| 24 | 0.56 |
| 25 | 0.58 |
| 26 | 0.60 |
| 27 | 0.62 |
| 28 | 0.64 |
| 29 | 0.66 |
| 30 | 0.68 |
| 31 | 0.70 |
| 32 | 0.72 |
| 33 | 0.74 |
| 34 | 0.76 |
| 35 | 0.78 |
| 36 | 0.80 |
| 37 | 0.82 |
| 38 | 0.84 |
| 39 | 0.86 |
| 40 | 0.88 |
| 41 | 0.90 |
| 42 | 0.92 |
| 43 | 0.94 |
| 44 | 0.96 |
| 45 | 0.98 |

FIG. 10B

| FRAME NUMBER | STILL IMAGE EXTRACTION CALCULATION AMOUNT |
|---|---|
| 46 | 0.10 |
| 47 | 0.12 |
| 48 | 0.14 |
| 49 | 0.16 |
| 50 | 0.18 |
| 51 | 0.20 |
| 52 | 0.22 |
| 53 | 0.24 |
| 54 | 0.26 |
| 55 | 0.28 |
| 56 | 0.30 |
| 57 | 0.32 |
| 58 | 0.34 |
| 59 | 0.36 |
| 60 | 0.38 |
| 61 | 0.40 |
| 62 | 0.42 |
| 63 | 0.44 |
| 64 | 0.46 |
| 65 | 0.48 |
| 66 | 0.50 |
| 67 | 0.52 |
| 68 | 0.54 |
| 69 | 0.56 |
| 70 | 0.58 |
| 71 | 0.60 |
| 72 | 0.62 |
| 73 | 0.64 |
| 74 | 0.66 |
| 75 | 0.68 |
| 76 | 0.70 |
| 77 | 0.72 |
| 78 | 0.74 |
| 79 | 0.76 |
| 80 | 0.78 |
| 81 | 0.80 |
| 82 | 0.82 |
| 83 | 0.84 |
| 84 | 0.86 |
| 85 | 0.88 |
| 86 | 0.90 |
| 87 | 0.92 |
| 88 | 0.94 |
| 89 | 0.96 |
| 90 | 0.98 |

FIG. 11A

| FRAME NUMBER | FOCUS | LESS BLURS | BRIGHTNESS DISTRIBUTION | OBJECT RECOGNIZABILITY | WEIGHTED AVERAGE | | | | |
|---|---|---|---|---|---|---|---|---|---|
| 1 | 0.5 | 0.6 | 1.0 | 0.0 | 0.5 | ↑ | | | |
| 2 | 0.4 | 0.6 | 1.0 | 0.0 | 0.5 | | | | |
| 3 | 0.3 | 0.6 | 1.0 | 0.0 | 0.5 | | | | |
| 4 | 0.2 | 0.6 | 1.0 | 0.0 | 0.4 | | | | |
| 5 | 0.2 | 0.6 | 1.0 | 0.0 | 0.4 | | | | |
| 6 | 0.2 | 0.6 | 0.5 | 0.0 | 0.4 | | | | |
| 7 | 0.2 | 0.6 | 0.1 | 0.0 | 0.3 | | | FLASH | |
| 8 | 0.2 | 0.6 | 0.5 | 0.0 | 0.4 | | | ↓ | |
| 9 | 0.2 | 0.6 | 1.0 | 0.0 | 0.4 | | | | |
| 10 | 0.2 | 0.6 | 1.0 | 0.0 | 0.4 | ZOOM | | | |
| 11 | 0.2 | 0.6 | 1.0 | 0.0 | 0.4 | | | | |
| 12 | 0.2 | 0.6 | 1.0 | 0.0 | 0.4 | | | | |
| 13 | 0.2 | 0.6 | 1.0 | 0.0 | 0.4 | | | | |
| 14 | 0.2 | 0.6 | 0.5 | 0.0 | 0.4 | | | ↑ | |
| 15 | 0.2 | 0.6 | 0.1 | 0.0 | 0.3 | | | FLASH | |
| 16 | 0.2 | 0.6 | 0.5 | 0.0 | 0.4 | | | ↓ | |
| 17 | 0.4 | 0.6 | 1.0 | 0.0 | 0.5 | | | | |
| 18 | 0.6 | 0.5 | 1.0 | 0.0 | 0.5 | | ↑ | | |
| 19 | 0.7 | 0.3 | 1.0 | 0.0 | 0.5 | ↓ | | | |
| 20 | 0.7 | 0.1 | 1.0 | 0.0 | 0.4 | | | | |
| 21 | 0.7 | 0.1 | 1.0 | 0.0 | 0.4 | | | | |
| 22 | 0.7 | 0.1 | 1.0 | 0.0 | 0.4 | | | | |
| 23 | 0.7 | 0.1 | 1.0 | 0.0 | 0.4 | | | | |
| 24 | 0.7 | 0.1 | 1.0 | 0.0 | 0.4 | | | | |
| 25 | 0.7 | 0.1 | 1.0 | 0.0 | 0.4 | | | | |
| 26 | 0.7 | 0.1 | 1.0 | 0.0 | 0.4 | | | | |
| 27 | 0.7 | 0.1 | 1.0 | 0.0 | 0.4 | | PANNING | | |
| 28 | 0.7 | 0.1 | 1.0 | 0.0 | 0.4 | | | | |
| 29 | 0.7 | 0.1 | 1.0 | 0.0 | 0.4 | | | | |
| 30 | 0.7 | 0.1 | 1.0 | 0.0 | 0.4 | | | | |
| 31 | 0.7 | 0.1 | 0.5 | 0.0 | 0.4 | | | ↑ | |
| 32 | 0.7 | 0.1 | 0.1 | 0.0 | 0.3 | | | FLASH | |
| 33 | 0.7 | 0.1 | 0.5 | 0.0 | 0.4 | | | ↓ | |
| 34 | 0.7 | 0.1 | 1.0 | 0.0 | 0.4 | | | | |
| 35 | 0.8 | 0.3 | 1.0 | 1.0 | 0.7 | | | | |
| 36 | 0.9 | 0.5 | 1.0 | 1.0 | 0.8 | | ↓ | | |
| 37 | 0.9 | 0.5 | 1.0 | 1.0 | 0.8 | | | | ↑ |
| 38 | 0.9 | 0.5 | 1.0 | 1.0 | 0.8 | | | | |
| 39 | 0.9 | 0.5 | 1.0 | 1.0 | 0.8 | | | | |
| 40 | 0.9 | 0.5 | 1.0 | 1.0 | 0.8 | | | | CENTERING |
| 41 | 0.9 | 0.5 | 1.0 | 1.0 | 0.8 | | | | |
| 42 | 0.9 | 0.5 | 1.0 | 1.0 | 0.8 | | | | |
| 43 | 0.9 | 0.7 | 1.0 | 1.0 | 0.9 | | | | |
| 44 | 0.9 | 0.8 | 1.0 | 1.0 | 0.9 | | | | ↓ |
| 45 | 1.0 | 1.0 | 1.0 | 1.0 | 1.0 | | | | |

FIG. 11B

| FRAME NUMBER | FOCUS | LESS BLURS | BRIGHTNESS DISTRIBUTION | OBJECT RECOGNIZABILITY | WEIGHTED AVERAGE | | | |
|---|---|---|---|---|---|---|---|---|
| 46 | 1.0 | 1.0 | 1.0 | 1.0 | 1.0 | | | |
| 47 | 1.0 | 1.0 | 1.0 | 1.0 | 1.0 | | | |
| 48 | 1.0 | 1.0 | 1.0 | 1.0 | 1.0 | | | |
| 49 | 1.0 | 1.0 | 1.0 | 1.0 | 1.0 | | | |
| 50 | 1.0 | 1.0 | 1.0 | 1.0 | 1.0 | | | |
| 51 | 1.0 | 1.0 | 1.0 | 1.0 | 1.0 | | | |
| 52 | 1.0 | 1.0 | 1.0 | 1.0 | 1.0 | | | |
| 53 | 1.0 | 1.0 | 1.0 | 1.0 | 1.0 | | | |
| 54 | 1.0 | 1.0 | 0.5 | 1.0 | 0.9 | | ↕ | |
| 55 | 1.0 | 1.0 | 0.1 | 0.0 | 0.7 | | | |
| 56 | 1.0 | 1.0 | 0.5 | 1.0 | 0.9 | | | |
| 57 | 1.0 | 1.0 | 1.0 | 1.0 | 1.0 | | | |
| 58 | 1.0 | 1.0 | 1.0 | 1.0 | 1.0 | | | |
| 59 | 1.0 | 1.0 | 1.0 | 1.0 | 1.0 | | | |
| 60 | 1.0 | 1.0 | 0.5 | 1.0 | 0.9 | | ↕ | |
| 61 | 1.0 | 1.0 | 0.1 | 0.0 | 0.7 | | | |
| 62 | 1.0 | 1.0 | 0.5 | 1.0 | 0.9 | | | |
| 63 | 1.0 | 1.0 | 1.0 | 1.0 | 1.0 | | | |
| 64 | 1.0 | 1.0 | 1.0 | 1.0 | 1.0 | | | |
| 65 | 1.0 | 1.0 | 1.0 | 1.0 | 1.0 | | | |
| 66 | 1.0 | 1.0 | 1.0 | 1.0 | 1.0 | | | |
| 67 | 1.0 | 1.0 | 1.0 | 1.0 | 1.0 | | | |
| 68 | 1.0 | 1.0 | 1.0 | 1.0 | 1.0 | | | |
| 69 | 1.0 | 1.0 | 1.0 | 1.0 | 1.0 | | | |
| 70 | 1.0 | 1.0 | 1.0 | 1.0 | 1.0 | | | |
| 71 | 1.0 | 1.0 | 1.0 | 1.0 | 1.0 | | | |
| 72 | 1.0 | 1.0 | 1.0 | 1.0 | 1.0 | | | |
| 73 | 1.0 | 1.0 | 1.0 | 1.0 | 1.0 | | | |
| 74 | 1.0 | 1.0 | 1.0 | 1.0 | 1.0 | | | |
| 75 | 1.0 | 1.0 | 1.0 | 1.0 | 1.0 | | | |
| 76 | 1.0 | 1.0 | 1.0 | 1.0 | 1.0 | | | |
| 77 | 1.0 | 1.0 | 1.0 | 1.0 | 1.0 | | | |
| 78 | 1.0 | 1.0 | 1.0 | 1.0 | 1.0 | | | |
| 79 | 1.0 | 1.0 | 1.0 | 1.0 | 1.0 | | | |
| 80 | 1.0 | 1.0 | 1.0 | 1.0 | 1.0 | | | |
| 81 | 1.0 | 1.0 | 1.0 | 1.0 | 1.0 | | | |
| 82 | 1.0 | 1.0 | 1.0 | 1.0 | 1.0 | | | |
| 83 | 1.0 | 1.0 | 1.0 | 1.0 | 1.0 | | | |
| 84 | 1.0 | 1.0 | 1.0 | 1.0 | 1.0 | | | |
| 85 | 1.0 | 1.0 | 0.5 | 1.0 | 0.9 | | ↕ | |
| 86 | 1.0 | 1.0 | 0.1 | 0.0 | 0.7 | | | |
| 87 | 1.0 | 1.0 | 0.5 | 1.0 | 0.9 | | | |
| 88 | 1.0 | 1.0 | 1.0 | 1.0 | 1.0 | | | |
| 89 | 1.0 | 1.0 | 1.0 | 1.0 | 1.0 | | | |
| 90 | 1.0 | 1.0 | 1.0 | 1.0 | 1.0 | | | |

FIG. 12A

| FRAME NUMBER | AMOUNT OF DIFFERENCE BETWEEN STILL IMAGES | | | | |
|---|---|---|---|---|---|
| 1 | 0.50 | | | | |
| 2 | 0.50 | | | | |
| 3 | 0.60 | | | | |
| 4 | 0.60 | | | | |
| 5 | 0.60 | | | | |
| 6 | 0.70 | | | | |
| 7 | 0.70 | | | FLASH | |
| 8 | 0.70 | | | | |
| 9 | 0.70 | | | | |
| 10 | 0.50 | ZOOM | | | |
| 11 | 0.50 | | | | |
| 12 | 0.50 | | | | |
| 13 | 0.50 | | | | |
| 14 | 0.70 | | | | |
| 15 | 0.70 | | | FLASH | |
| 16 | 0.70 | | | | |
| 17 | 0.80 | | | | |
| 18 | 0.70 | | | | |
| 19 | 0.80 | | | | |
| 20 | 0.80 | | | | |
| 21 | 0.80 | | | | |
| 22 | 0.80 | | | | |
| 23 | 0.80 | | | | |
| 24 | 0.80 | | | | |
| 25 | 0.80 | | | | |
| 26 | 0.80 | | | | |
| 27 | 0.80 | | PANNING | | |
| 28 | 0.80 | | | | |
| 29 | 0.80 | | | | |
| 30 | 0.80 | | | | |
| 31 | 1.00 | | | | |
| 32 | 1.00 | | | FLASH | |
| 33 | 1.00 | | | | |
| 34 | 1.00 | | | | |
| 35 | 0.80 | | | | |
| 36 | 0.70 | | | | |
| 37 | 0.60 | | | | |
| 38 | 0.60 | | | | |
| 39 | 0.60 | | | | |
| 40 | 0.60 | | | | CENTERING |
| 41 | 0.60 | | | | |
| 42 | 0.60 | | | | |
| 43 | 0.60 | | | | |
| 44 | 0.50 | | | | |
| 45 | 0.10 | | | | |

FIG. 12B

| FRAME NUMBER | AMOUNT OF DIFFERENCE BETWEEN STILL IMAGES | | | | |
|---|---|---|---|---|---|
| 46 | 0.10 | | | | |
| 47 | 0.40 | | | | |
| 48 | 0.40 | | | | |
| 49 | 0.40 | | | | |
| 50 | 0.10 | | | | |
| 51 | 0.10 | | | | |
| 52 | 0.10 | | | | |
| 53 | 0.10 | | | | |
| 54 | 0.60 | | | ↕ | |
| 55 | 0.70 | | | | |
| 56 | 0.60 | | | | |
| 57 | 0.60 | | | | |
| 58 | 0.10 | | | | |
| 59 | 0.10 | | | | |
| 60 | 0.60 | | | ↕ | |
| 61 | 0.70 | | | | |
| 62 | 0.60 | | | | |
| 63 | 0.60 | | | | |
| 64 | 0.10 | | | | |
| 65 | 0.10 | | | | |
| 66 | 0.10 | | | | |
| 67 | 0.40 | | | | |
| 68 | 0.40 | | | | |
| 69 | 0.40 | | | | |
| 70 | 0.10 | | | | |
| 71 | 0.10 | | | | |
| 72 | 0.10 | | | | |
| 73 | 0.10 | | | | |
| 74 | 0.10 | | | | |
| 75 | 0.10 | | | | |
| 76 | 0.10 | | | | |
| 77 | 0.10 | | | | |
| 78 | 0.10 | | | | |
| 79 | 0.10 | | | | |
| 80 | 0.10 | | | | |
| 81 | 0.10 | | | | |
| 82 | 0.40 | | | | |
| 83 | 0.40 | | | | |
| 84 | 0.40 | | | | |
| 85 | 0.60 | | | | ↕ |
| 86 | 0.70 | | | | |
| 87 | 0.60 | | | | |
| 88 | 0.60 | | | | |
| 89 | 0.10 | | | | |
| 90 | 0.10 | | | | |

FIG. 13A

| FRAME NUMBER | ACCUMULATION GAIN |
|---|---|
| 1 | 0.383 |
| 2 | 0.373 |
| 3 | 0.380 |
| 4 | 0.370 |
| 5 | 0.377 |
| 6 | 0.358 |
| 7 | 0.332 |
| 8 | 0.372 |
| 9 | 0.420 |
| 10 | 0.393 |
| 11 | 0.400 |
| 12 | 0.407 |
| 13 | 0.413 |
| 14 | 0.412 |
| 15 | 0.385 |
| 16 | 0.425 |
| 17 | 0.523 |
| 18 | 0.530 |
| 19 | 0.537 |
| 20 | 0.510 |
| 21 | 0.517 |
| 22 | 0.523 |
| 23 | 0.530 |
| 24 | 0.537 |
| 25 | 0.543 |
| 26 | 0.550 |
| 27 | 0.557 |
| 28 | 0.563 |
| 29 | 0.570 |
| 30 | 0.577 |
| 31 | 0.575 |
| 32 | 0.548 |
| 33 | 0.588 |
| 34 | 0.637 |
| 35 | 0.743 ← |
| 36 | 0.783 |
| 37 | 0.773 |
| 38 | 0.780 |
| 39 | 0.787 |
| 40 | 0.793 ← |
| 41 | 0.800 |
| 42 | 0.807 |
| 43 | 0.847 |
| 44 | 0.870 |
| 45 | 0.846 ← |

FIG. 13B

| FRAME NUMBER | ACCUMULATION GAIN |
|---|---|
| 46 | 0.550 |
| 47 | 0.607 |
| 48 | 0.613 |
| 49 | 0.620 |
| 50 | 0.577 |
| 51 | 0.583 |
| 52 | 0.590 |
| 53 | 0.597 |
| 54 | 0.645 |
| 55 | 0.552 |
| 56 | 0.658 |
| 57 | 0.707 ← |
| 58 | 0.630 |
| 59 | 0.637 |
| 60 | 0.685 |
| 61 | 0.592 |
| 62 | 0.698 |
| 63 | 0.747 ← |
| 64 | 0.670 |
| 65 | 0.677 |
| 66 | 0.683 |
| 67 | 0.740 |
| 68 | 0.747 ← |
| 69 | 0.753 |
| 70 | 0.710 |
| 71 | 0.717 |
| 72 | 0.723 |
| 73 | 0.730 ← |
| 74 | 0.737 |
| 75 | 0.743 |
| 76 | 0.750 |
| 77 | 0.757 |
| 78 | 0.763 ← |
| 79 | 0.770 |
| 80 | 0.777 |
| 81 | 0.783 |
| 82 | 0.840 |
| 83 | 0.847 ← |
| 84 | 0.853 |
| 85 | 0.852 |
| 86 | 0.758 |
| 87 | 0.865 |
| 88 | 0.913 ← |
| 89 | 0.837 |
| 90 | 0.843 |

STILL IMAGE PROVISION DEVICE

INCORPORATION BY REFERENCE

This application is based upon and claims the benefit of priority from Japanese patent application No. 2013-168125, filed on Aug. 13, 2013, the disclosure of which is incorporated herein in its entirety by reference.

TECHNICAL FIELD

The present invention relates to a still image provision device, a still image provision system, a still image provision method, and a program.

BACKGROUND ART

In the fields of video monitoring, video analysis, and so on, there is a case of, in accordance with a request from a request source, extracting a still image from a moving image and providing the request source with the extracted still image. In this case, a response time gets long in a case where a process of extracting a still image from a moving image is started at the time of request.

Then, as a related art relating to the present invention, it is proposed to extract still images from a moving picture and store the still images into a cache in advance and, when there is a request actually, retrieve a still image from the cache and provide a request source with the still image, as is disclosed in Patent Document 1, for example.

Patent Document 1: Japanese Unexamined Patent Application Publication No. JP-A 2013-090194

Because of the limit of cache capacity, it is difficult to store all still images extracted from a moving image into a cache. Therefore, there is a need to select still images to be stored into a cache from among a plurality of still images extracted from a moving image.

Regarding such selection, the abovementioned related art relating to the present invention employs a method as described below.

A still image extracted from a moving image by using the latest version of image processing program is stored into a cache. In a case where the still image extracted by using the latest version of image processing program is requested by a request source, the still image is retrieved from the cache and transmitted to the request source. In a case where a still image extracted by using a different version from the latest version of image processing program is requested by a request source, the still image is extracted from a moving image by using that version of image processing program and transmitted to the request source. In this case, the still image transmitted to the request source is stored into the cache. When the amount of data in the cache exceeds a given amount determined in advance, a still image with the earliest time of storage into the cache is erased from the cache.

However, according to the related art relating to the present invention, still images to be stored are determined without consideration for the cost of extraction of still images from a moving image, and therefore, a case will arise where still images with higher extraction cost among a plurality of still images extracted from a moving image are not cached. In other words, a case will arise where the cost of extraction of still images other than the stored still images is high.

Consequently, when there is a request for the still images other than the stored still images, it is difficult to extract the still images from the moving image at high speeds and at low load, and a response time is degraded.

SUMMARY

An object of the present invention is to provide a still image extraction device that solves the abovementioned problem, that is, a problem that when there is a request for a still image other than the stored still images, it is difficult to extract the still image from the moving image at high speeds and at low load.

A still image extraction device according to an aspect of the present invention is a still image provision device transmitting a still image requested by a request source among a plurality of still images composing a moving image to the request source, the still image provision device including:

a moving image acquiring part configured to acquire a moving image;

a still image accumulating part configured to store still images composing the moving image;

an image processing part configured to, before request by the request source, calculate a gain of each of the still images obtained by storing the still image based on a cost of extraction of the still image from the moving image, and extract the still image with the higher gain from the moving image and store into the still image accumulating part; and a request processing part configured to retrieve the still image requested by the request source from the still image accumulating part and transmit to the request source and, in a case where the still image requested by the request source is not stored in the still image accumulating part, extract the still image requested by the request source from the moving image acquired by the moving image acquiring part and transmit to the request source.

A still image provision method according to another aspect of the present invention is a still image provision method executed by a still image provision device having a still image accumulating part configured to store still images and transmitting a still image requested by a request source among a plurality of still images composing a moving image to the request source, the still image provision method including:

before request by the request source, calculating a gain obtained by previously storing the still image based on a cost of extraction of the still image from the moving image, and extracting the still image with the higher gain from the moving image and storing into the still image accumulating part; and retrieving the still image requested by the request source from the still image accumulating part and transmitting to the request source and, in a case where the still image requested by the request source is not stored in the still image accumulating part, extracting the still image requested by the request source from the moving image including the still image and transmitting to the request source.

A non-transitory computer-readable medium storing a program according to another aspect of the present invention is a non-transitory computer-readable medium storing a program including instructions for causing a computer, which has a still image accumulating part configured to store still images and transmits a still image requested by a request source among a plurality of still images composing a moving image to the request source, to function as:

a moving image acquiring part configured to acquire a moving image;

an image processing part configured to, before request by the request source, calculate a gain obtained by previously storing the still image based on a cost of extraction of the still image from the moving image, and extract the still image with the higher gain among the plurality of still images composing the moving image, from the moving image, and store into the still image accumulating part; and a request processing part configured to retrieve the still image requested by the request source from the still image accumulating part and transmit to the request source and, in a case where the still image requested by the request source is not stored in the still image accumulating part, extract the still image requested by the request source from the moving image acquired by the moving image acquiring part and transmit to the request source.

Because the present invention has the abovementioned configurations, it is possible, when there is a request for a still image other than the stored still images, to extract the still image from the moving image at high speeds and at low cost.

BRIEF DESCRIPTION OF DRAWINGS

FIGS. 10A and 10B are diagrams showing an example of the result of calculation of the cost of extraction of each still image in the second exemplary embodiment of the present invention;

FIGS. 11A and 11B are diagrams showing an example of the result of calculation of the quality of each still image in the second exemplary embodiment of the present invention;

FIGS. 12A and 12B are diagrams showing an example of the result of calculation of the difference of each still image in the second exemplary embodiment of the present invention;

FIGS. 13A and 13B are diagrams showing an example of the result of calculation of the accumulation gain of each still image in the second exemplary embodiment of the present invention;

EXEMPLARY EMBODIMENT

Figure 1:
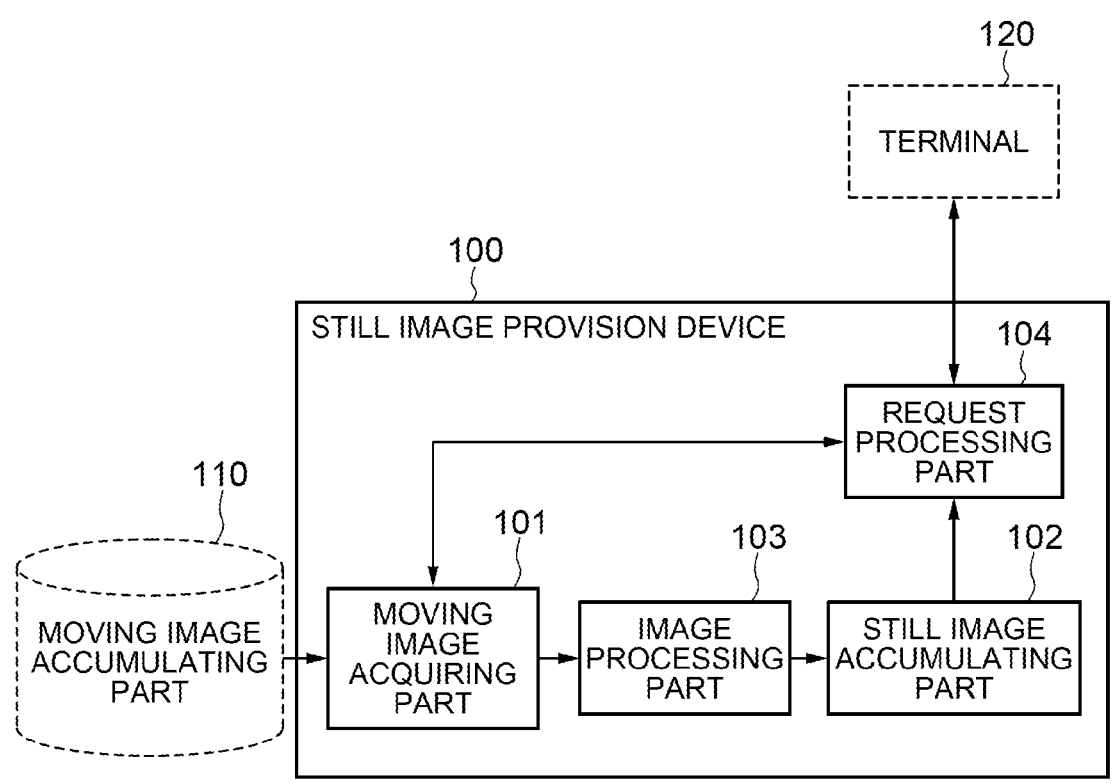
FIG. 1 is a block diagram of a first exemplary embodiment of the present invention.

Next, exemplary embodiments of the present invention will be described in detail referring to the drawings.

First Exemplary Embodiment

Referring to FIG. 1, a still image provision device 100 according to a first exemplary embodiment of the present invention includes a moving image acquiring part 101, a still image accumulating part 102, an image processing part 103, and a request processing part 104.

The moving image acquiring part 101 has a function of acquiring a moving image from the outside of the still image provision device 100. For example, the moving image acquiring part 101 may acquire a moving image from a moving image accumulating part 110 that stores moving images. Moreover, the moving image acquiring part 101 may acquire a moving image from an external device through a network.

The still image accumulating part 102 has a function of storing a still image. The still image accumulating part 102 is formed by a file device that stores data into a storage device such as a hard disk device or a semiconductor memory and manages the data, for example.

The image processing part 103 has a function of extracting a still image from a moving image acquired by the moving image acquiring part 101 and storing the still image into the still image accumulating part 102. In storage of a still image into the still image accumulating part 102, the image processing part 103 calculates a gain (hereinafter, referred to as an accumulation gain) obtained by previously storing the still image based on the cost of extraction of the still image from the moving image, extracts some still images with a higher gain from among a plurality of still images extracted from the moving image, and stores the still images into the still image accumulating part 102.

A method for calculating the cost of extraction of a still image from a moving image may be any method. For example, methods as described below may be used.

One of the methods is a method based on the form of storing a still image in a moving image. A moving image is a series of still images, and a difference between consecutive still images is small. By exploiting this property, information of most of still images composing a moving image is generally compressed by using information of a difference from a neighboring still image. Therefore, to extract a specific still image from a moving image, it is required to extract not only information of a target still image but also information of a still image neighboring the target still image. Thus, it is possible to estimate the cost of extraction of a still image from a moving image based on the number of required still images neighboring the still image.

The other of the methods is a method of actually extracting still images from a moving image and measuring a time taken to extract each of the images.

Further, a method for calculating the accumulation gain of a still image is any method. For example, the accumulation gain of a still image may be the cost of extraction of the still image. Alternatively, the accumulation gain of a still image may be calculated based on the cost of extraction of the still image and any index value other than the cost of extraction of the still image.

The request processing part 104 has a function of retrieving a still image requested by a request source from the still image accumulating part 102 and transmitting the still image to the request source. Moreover, the request processing part 104 has a function of, in a case where a still image requested by a request source is not stored in the still image accumulating part 102, extracting the still image requested by the request source from a moving image acquired by the moving image acquiring part 101 and transmitting the still image to the request source. A request source may be a terminal device 120 located outside the still image provision device 100, for example. Moreover, a request sent from a request source to the request processing part 104 may include a moving image identifier that uniquely specifies a moving image, and a still image identifier that uniquely specifies a still image in the moving image specified by the moving image identifier.

The still image provision device 100 can be realized by, for example, a computer having a communication function and a program. The program is stored in a storage medium such as a magnetic disk device, and loaded to the computer when the computer is started up. The program controls the operation of the computer, and thereby causes the computer to function as the moving image acquiring part 101, the still image accumulating part 102, the image processing part 103, and the request processing part 104.

Next, the operation of the still image provision device 100 according to this exemplary embodiment will be described.

Figure 2:
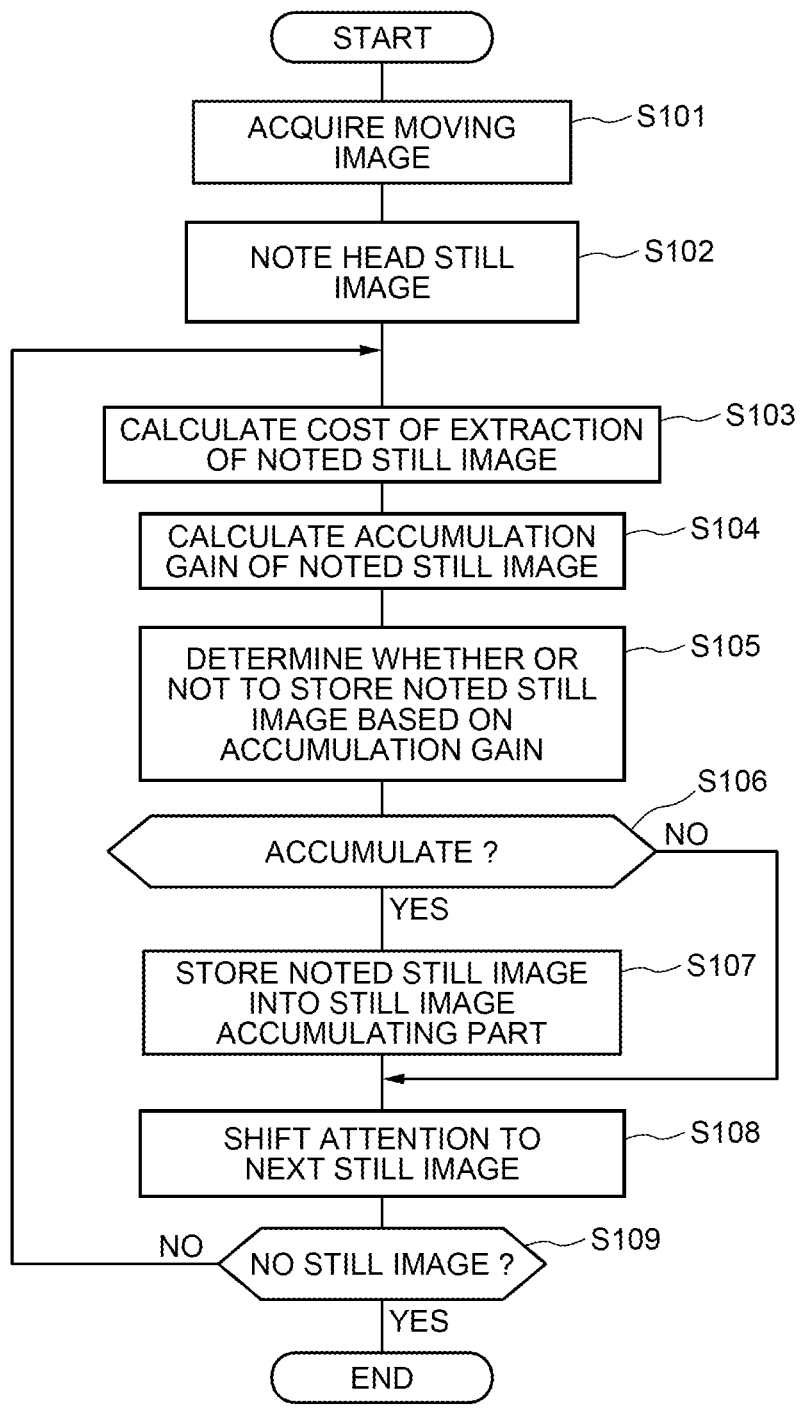
FIG. 2 is a flowchart showing the operation of the first exemplary embodiment of the present invention.

Before accepting a request from a request source, the still image provision device 100 executes a process shown in a flowchart of FIG. 2.

First, the moving image acquiring part 101 of the still image provision device 100 acquires a moving image from the moving image accumulating part 110, and transmits the moving image to the image processing part 103 (step S101). Next, the image processing part 103 notes a head still image of the moving image accepted from the moving image acquiring part 101 (step S102).

Next, the image processing part 103 calculates the cost of extraction of the noted still image from the moving image (step S103). Next, the image processing part 103 calculates the accumulation gain of the noted still image based on the calculated extraction cost (step S104). Next, the image processing part 103 determines whether or not to store the noted still image, based on the calculated accumulation gain (step S105). In the determination whether or not to store, for example, the image processing part 103 compares the calculated accumulation gain with a threshold and, when the accumulation gain exceeds the threshold, determines to store, and otherwise, determines not to store. However, a method for determining whether or not to store is not limited to the abovementioned one, and any other determination method may be employed.

Next, when determining to store the noted still image (YES at step S106), the image processing part 103 stores the noted still image extracted from the moving image, into the still image accumulating part 102 (step S107). At this time, with the noted still image stored in the still image accumulating part 102, a combination of a moving image identifier that uniquely specifies a moving image where the noted still image is included and a still image identifier that uniquely specifies the noted still image in the moving image are associated. On the other hand, when determining not to store the noted still image (NO at step S107), the image processing part 103 skips step S107.

Upon finishing the abovementioned processing on the noted still image, the image processing part 103 shifts attention to a next still image in the moving image (step S108). Then, when there is a next still image to be noted (NO at step S109), the image processing part 103 returns to step S103 and executes the abovementioned processing at steps S103 to S107 again. On the other hand, when there is not a next still image to be noted (YES at step S109), namely, when execution of the processing at steps S103 to S107 on a final still image of the moving image is completed, the image processing part 103 ends the process shown in FIG. 2.

Through execution of the processing as described above, among a plurality of still images composing a moving image, some still images with high accumulation gains are stored into the still image accumulating part 102.

Figure 3:
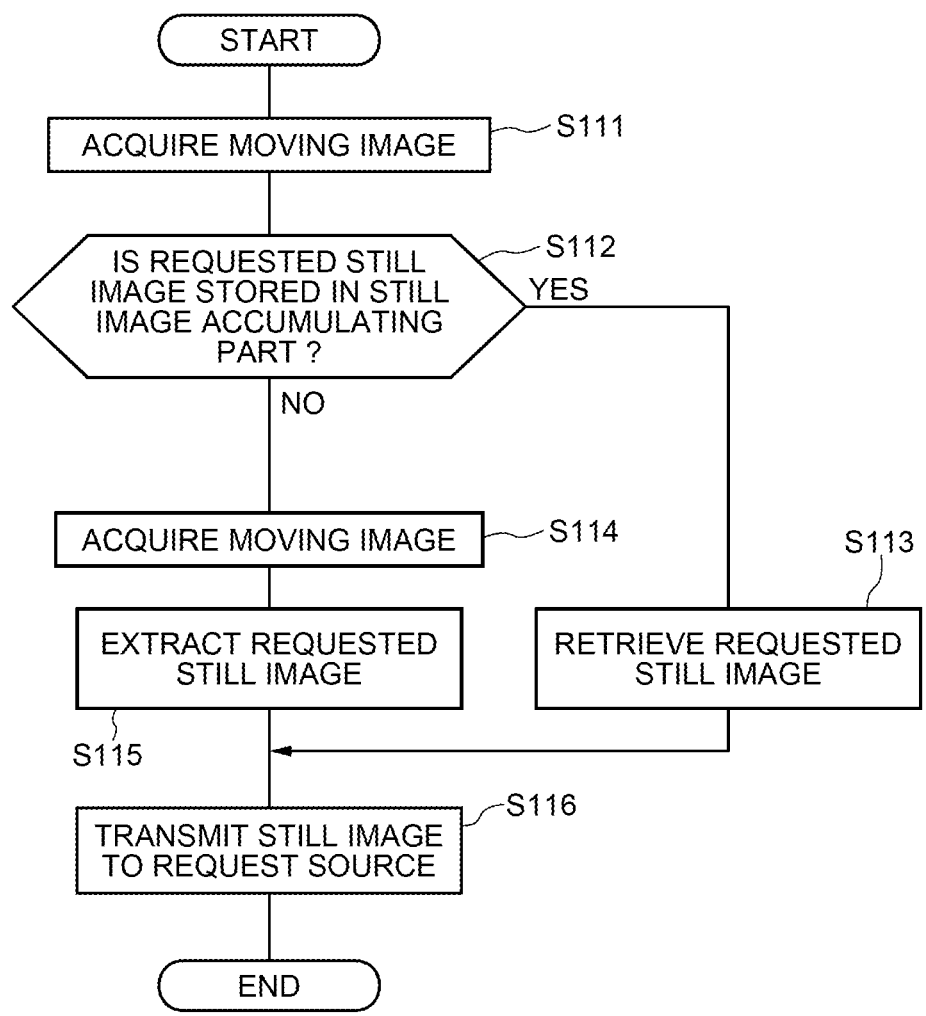
FIG. 3 is a flowchart showing the operation of the first exemplary embodiment of the present invention.

Next, the operation of the still image provision device 100 when a request source makes a request for a still image will be described referring to a flowchart of FIG. 3.

When the terminal 120 makes a request for a still image to the still image provision device 100, the request processing part 104 receives the request (step S111). Next, the request processing part 104 examines whether or not a still image corresponding to the combination of a moving image identifier and a still image identifier included in the request is stored in the still image accumulating part 102 (step S112). Next, in a case where the requested still image is stored (YES at step S112), the request processing part 104 retrieves the requested still image from the still image accumulating part 102 (step S113), and transmits the retrieved still image to the request source (step S116).

On the other hand, in a case where the requested still image is not stored in the still image accumulating part 102 (NO at step S112), the request processing part 104 first acquires a moving image including the requested still image through the moving image acquiring part 101 (step S114). Next, the request processing part 104 extracts the requested still image from the acquired moving image (step S115). Next, the moving image acquiring part 101 transmits the extracted still image to the request source (step S116).

Thus, according to this exemplary embodiment, when a still image included by a moving image is requested, it is possible to speedily provide a request source with the still image. This is because some of still images composing a moving image are extracted and accumulated in the still image accumulating part in advance and, in a case where a requested still image is stored in the still image accumulating part, all that is required is retrieving the still image from the still image accumulating part.

Further, according to this exemplary embodiment, when a still image other than the still image previously stored in the still image accumulating part is requested, it is possible to extract the requested still image from the moving image at high speeds and at low load. This is because a gain obtained by previously storing is calculated based on the cost of extraction of a still image from a moving image, and some still images with high gains are selected from among the still images composing the moving image and stored into the still image accumulating part 102, and therefore, it is less probable that a still image with high extraction cost is included in still images other than the stored still images.

Second Exemplary Embodiment

<Characteristics of this Exemplary Embodiment>

According to this exemplary embodiment, a device transmitting a requested still image of a moving image to a request source previously extracts and stores some still images of high importance in extracting still images judging from the characteristic and content of a moving image, thereby providing a request source with a still image at high speeds and at low cost when there is a request from the request source.

<Problems to be Solved by this Exemplary Embodiment>

In the fields of video monitoring, video analysis, and so on, there is a case of extracting a still image having a certain property from a large number of moving images. For example, images of disaster sites may be extracted from a large number of videos of exterior monitoring cameras when a disaster occurs, or images of people having been in an incident site may be extracted from a large number of videos of street cameras when an incident occurs. In such cases, there is a need to extract a large number of still images from moving images in a short time when an event occurs or when a monitor operates.

A moving image is a series of still images, and a difference between consecutive still images is small. By exploiting this property, information of most of still images composing a moving image is generally compressed by using information of a difference from a neighboring still image. Therefore, to extract a specific still image from a moving image, there is a need to extract not only information of a target still image but also information of a still image neighboring the target still image. This is a process which requires a lot of computer resources and time. In a case where there is a need to execute such a process on a large amount in a short time, an increase in cost due to a need to prepare for a large amount of calculation resources with low use rates occurs, or a decrease in operability due to degradation of a response time occurs.

In other fields such as document retrieval and so on, in order to solve the same type of problem, a method of previously generating and storing the results of retrieval is often employed. However, the reality is that it is difficult to apply this method to still images, because an image is generally a large amount of information and an extremely large capacity of storage medium is needed to store all still images included in a moving image.

<Outline of this Exemplary Embodiment>

This exemplary embodiment solves a task that a large amount of computer resources are needed for a process of extracting still images from a moving image, by means of previously generating and storing still images. Moreover, this exemplary embodiment solves a task that an extremely large capacity of storage medium is needed to previously store still images, by means of selecting and storing still images with large gains obtained by previously storing, by exploiting the property of a moving image.

In this exemplary embodiment, a still image providing part includes a moving image requesting part, a moving image analyzing part, a request analyzing part, a still image accumulating part, and a still image managing part. The moving image analyzing part acquires a moving image of the outside through the moving image requesting part, in an appropriate situation such as a time period when there is a margin of computer resources. Next, the moving image analyzing part extracts still images from the head of the moving image in order, and estimates a gain (an accumulation gain) obtained by previously storing each of the still images, based on the content of the still image, the computer resources and time required for extraction of the still image, a relation with still images already accumulated in the still image accumulating part, and so on. Next, the moving image analyzing part notifies the still image and the accumulation gain of the still image to the still image managing part. The still image managing part determines whether to store the still image into the still image accumulating part and, when determining to store, stores the still image into the still image accumulating part, and performs management such as deletion of still images already accumulated in the still image accumulating part as necessary. Thus, because only still images with large gain obtained by accumulating from a moving image are accumulated, it is possible to previously accumulate still images by using a practical capacity of storage medium.

Further, when a request for a still image is made to the request analyzing part from outside, the request analyzing part inquires of the still image managing part whether or not the still image exists and, when the still image exists in the still image accumulating part, the still image managing part provides the request analyzing part with the still image, and the request analyzing part transmits the still image to the outside. On the other hand, when the still image does not exist in the still image accumulating part, the request analyzing part acquires a moving image necessary for extraction of the still image from outside through the moving image requesting part, causes the moving image analyzing part to extract the still image, and the request analyzing part returns the still image to the outside. At this time, the moving image analyzing part acquires a still image that can be used for extraction of the still image from the still image managing part, thereby reducing computer resources and time necessary for analysis of the moving image. Moreover, the extracted still image is stored into the still image accumulating part based on determination by the still image managing part whether to store into the still image accumulating part. Consequently, when there is a request for a still image from outside, it is possible to reduce computer resources and time necessary for provision of the still image.

<Configuration of this Exemplary Embodiment>

Figure 4:
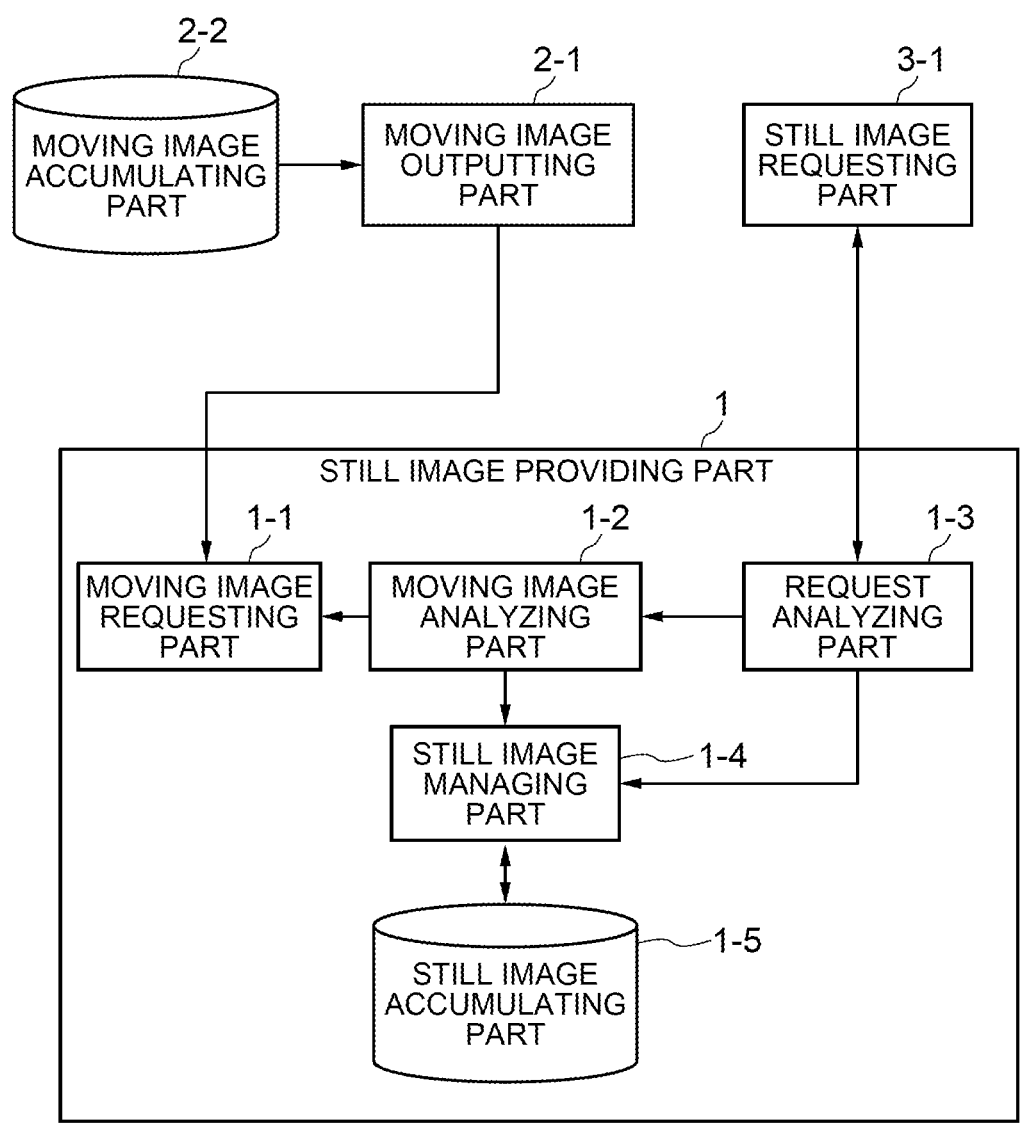
FIG. 4 is a block diagram of a second exemplary embodiment of the present invention.

Referring to FIG. 4, this exemplary embodiment is configured by a still image providing part 1 including: a moving image requesting part 1-1 that makes a request for moving image information to the outside and acquires a moving image; a moving image analyzing part 1-2 that extracts a still image from a moving image and calculates a gain obtained by storing the still image; a request analyzing part 1-3 that provides a still image in response to a still image request from the outside; a still image managing part 1-4 that determines whether or not to store a still image and, for example, adds, changes and deletes a still image to, in and from the still image accumulating part; and a still image accumulating part 1-5 that accumulates still images. Moreover, a moving image outputting part 2-1 that provides a moving image in response to a moving image output request, a moving image accumulating part 2-2 that retains a moving image to be outputted, and a still image requesting part 3-1 that requests for a still image exist outside the still image providing part 1.

Figure 5:
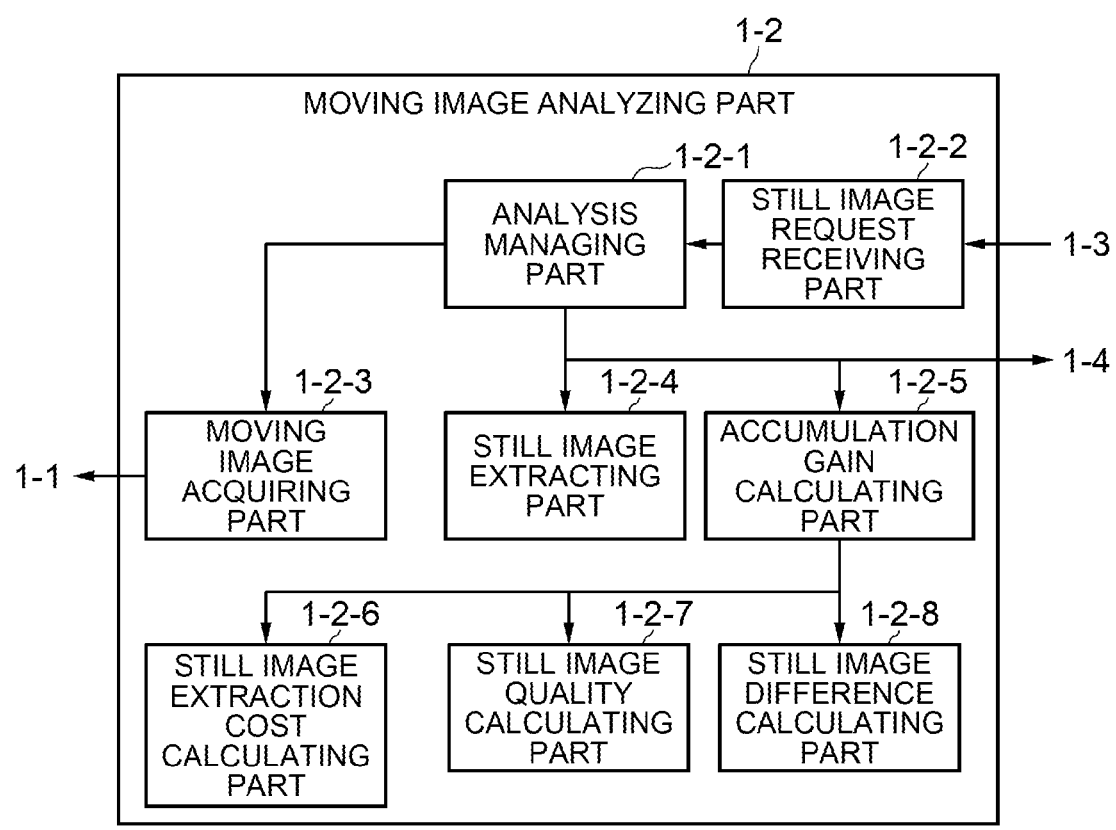
FIG. 5 is a block diagram of a moving image analyzing part in the second exemplary embodiment of the present invention.

Further, as shown in FIG. 5, the moving image analyzing part 1-2 includes: an analysis managing part 1-2-1 that manages an analysis process; a still image request receiving part 1-2-2 that receives a still image request from the request analyzing part 1-3; a moving image acquiring part 1-2-3 that acquires a moving image from the moving image requesting part 1-1; a still image extracting part 1-2-4 that extracts one still image or a plurality of still images from a moving image; an accumulation gain calculating part 1-2-5 that calculates the accumulation gain of a still image; a still image extraction cost calculating part 1-2-6 that calculates the cost of extraction of a specific still image from a moving image; a still image quality calculating part 1-2-7 that estimates the quality of a still image based on the imaging quality of the still image and the content of the image; and a still image difference calculating part 1-2-8 that calculates a difference between a still image and another still image.

Figure 6:
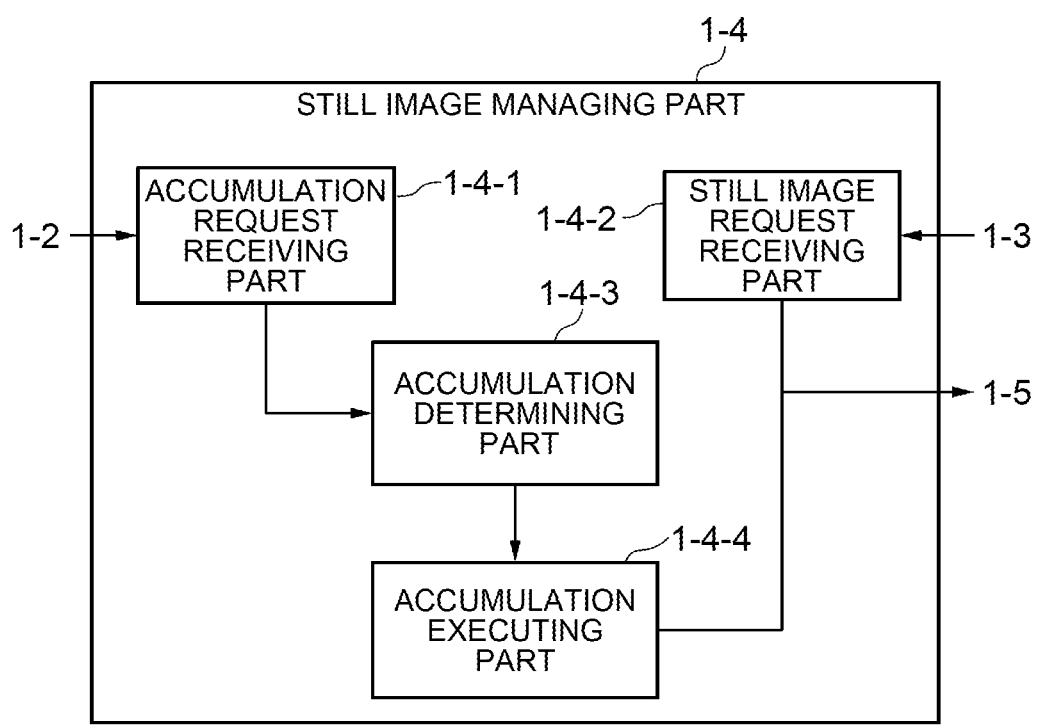
FIG. 6 is a block diagram of a still image managing part in the second exemplary embodiment of the present invention.

Further, as shown in FIG. 6, the still image managing part 1-4 includes: an accumulation request receiving part 1-4-1 that receives an accumulation request; a still image request receiving part 1-4-2 that receives a request for a still image and, when the requested still image is in the still image accumulating part 1-5, transmits the still image; an accumulation determining part 1-4-3 that determines whether it is possible to store a still image and whether it is necessary to delete an existing still image; and an accumulation executing part 1-4-4 that executes accumulation and deletion of still images.

<Operation of this Exemplary Embodiment>

Figure 7:
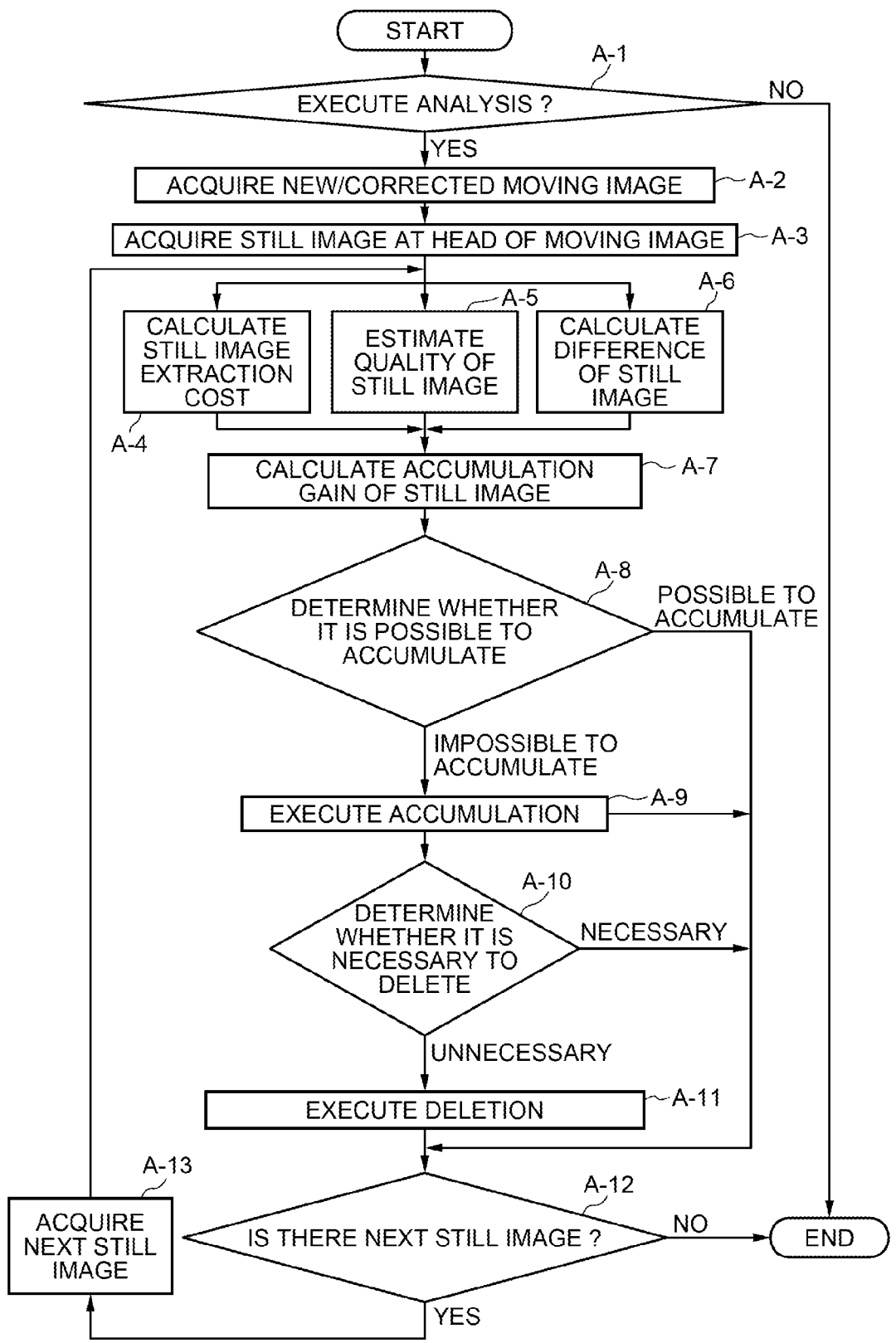
FIG. 7 is a flowchart showing the operation of the second exemplary embodiment of the present invention.

Next, referring to FIGS. 7 and 8, the operation of this exemplary embodiment will be described in detail.

The analysis managing part 1-2-1 regularly starts and determines whether or not to execute analysis based on the presence of a margin of computer resources, a lapse of time after execution of previous analysis, the presence of storage of a new moving image or correction of a moving image executed outside, and so on (step A-1). For example, in a case where 50% of the computer resources remain unused, 24 hours or more have passed from previous analysis, and storage of a new moving image or correction of a moving image is recognized outside, the analysis managing part 1-2-1 determines to start analysis.

In the case of determining to start analysis, the analysis managing part 1-2-1 uses the moving image acquiring part 1-2-3 to acquire a newly stored moving image or a corrected moving image from the moving image outputting part 2-1 (step A-2). The analysis managing part 1-2-1 transmits the acquired moving image to the still image extracting part 1-2-4, and the still image extracting part 1-2-4 acquires a still image at the head of the moving image and transmits the still image to the analysis managing part 1-2-1 (step A-3). The analysis managing part 1-2-1 transmits the acquired still image and moving image information of the acquisition source to the accumulation gain calculating part 1-2-5.

The accumulation gain calculating part 1-2-5 transmits received information to the still image extraction cost calculating part 1-2-6, the still image quality calculating part 1-2-7, and the still image difference calculating part 1-2-8.

Figure 9:
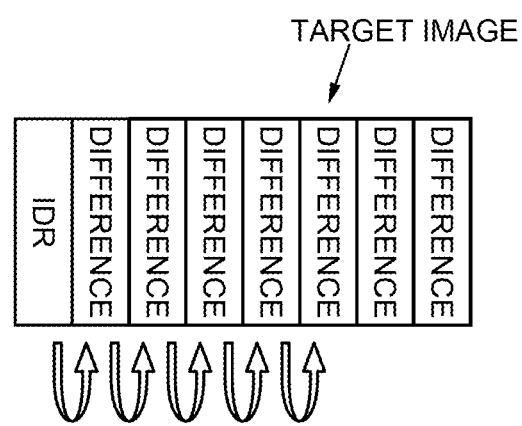
FIG. 9 is a diagram for describing calculation of the cost of extraction of a still image in the second exemplary embodiment of the present invention.

The still image extraction cost calculating part 1-2-6 analyzes the storage form of the received still image in the moving image of the extraction source, and calculates the cost (computer resources and time) of extraction of the still image (step A-4). In general, a moving image stores each image in the form of a difference from a reference still image as shown in FIG. 9. Therefore, based on the number of differences that should be calculated for extracting a target still image from a reference image and the performance of a computer that executes calculation, computer resources and time required to extract the still image are calculated.

FIGS. 10A and 10B show an example of the result of estimation of the amount of computer resources required to extract a still image from a certain moving image (a still image extraction calculation amount), for each frame number. Numerical values such as 0.10, 0.40 and 0.80 written in the fields of the still image extraction calculation amount in FIGS. 10A and 10B represent the cost of extraction of the respective frames. Herein, a larger numerical value represents a higher cost.

The still image quality calculating part 1-2-7 estimates and quantifies the quality of the still image (step A-5). For example, still images in a moving image include an unfocused image, an image blurred by jiggle of a camera, an image in which a target cannot be distinguished due to positional relation with a light source, and so on, and the necessity of extracting these images as individual still images is low. On the other hand, regarding an image in which a frontal face can be distinguished, an image in which letters are legible, and an image containing a whole person or object, the necessity of extracting these images as individual still images is high. The still image quality calculating part 1-2-7 can estimate and quantify the quality of a still image based on the focus, blurs, the extreme brightness distribution of the image, and the recognizability of a face, letters or an object.

FIGS. 11A and 11B show, for each frame number, an example of the result of estimation of the quality of a still image included in a certain moving image by quantifying the focus, less blurs, brightness distribution and object recognizability of the still image and calculating the weighted average thereof. Regarding numerical values such as 0.5 and 1.0 written in the fields of focus in FIGS. 11A and 11B, a larger numerical value represents that an image is more focused. Regarding numerical values such as 0.1, 0.3 and 1.0 written in the fields of less blurs, a larger numerical value represents that there are less blurs. Regarding numerical values such as 0.5 and 1.0 written in the fields of brightness distribution, a larger numerical value represents that the brightness distribution is wider. A numerical value 0.0 written in the field of object recognizability represents that an object is not recognizable, and a numerical value 1.0 written in the field of object recognizability represents that an object is recognizable. Regarding numerical values 0.3, 0.5 and 1.0 written in the fields of weighted average, a larger numerical value represents that the quality of a still image is better. In FIGS. 11A and 11B, periods of zooming, flashing, panning and centering of a moving image are additionally written for reference.

The still image difference calculating part 1-2-8 calculates a difference of the target still image from another still image (step A-6). The still image difference calculating part 1-2-8 compares the target still image with another still image included in the moving image, and determines that the still image has a large difference when a difference of the target still image from a still image in the normal state is large and when a difference of the target still image from the last still image is large. This is because it is highly probable that such a still image has captured a shift of scenery, a radical motion or occurrence of an unusual event and the necessity for extracting the still image as a still image is thought to be high.

FIGS. 12A and 12B show an example of the result of calculation of a difference between still images in a certain moving image, for each frame number. Regarding numerical values such as 0.50, 0.70 and 1.00 written in the fields of a difference amount between still images in FIGS. 12A and 12B, a larger numerical value represents that the amount of difference is larger.

The accumulation gain calculating part 1-2-5 receives the results of calculation by the still image extraction cost calculating part 1-2-6, the still image quality calculating part 1-2-7 and the still image difference calculating part 1-2-8, and calculates an accumulation gain (step A-7).

FIGS. 13A and 13B show an example of the result of calculation of the accumulation gain of a still image in a certain moving image, for each frame number. Regarding numerical values such as 0.373, 0.530 and 0.80 written in the fields of accumulation gain in FIGS. 13A and 13B, a larger numerical value represents that a gain is larger. In the case of calculating an accumulation gain as a weighted average value of the results of calculation by the still image extraction cost calculating part 1-2-6, the still image quality calculating part 1-2-7 and the still image difference calculating part 1-2-8, the gain becomes larger as the extraction cost is higher, as the quality is better, and as the amount of difference is more.

The analysis managing part 1-2-1 transmits the result of calculation by the accumulation gain calculating part 1-2-5, information of a moving image in which a target still image is included and the target still image to the accumulation request receiving part 1-4-1.

The accumulation determining part 1-4-3 determines whether it is possible to accumulate based on information received by the accumulation request receiving part 1-4-1 and information already accumulated in the still image accumulating part 1-5 (step A-8). A possible method for determining whether it is possible to accumulate is to, in a case where the available capacity of the still image accumulating part 1-5 exceeds a given value (in a case where there is a sufficient margin of the accumulation capacity), determine it is possible to accumulate when the accumulation gain of a received still image is more than a given value and, in a case where the available capacity is equal to or less than the given value (in a case where there is not a sufficient margin of the accumulation capacity), determine it is possible to accumulate when the accumulation gain of the received still image is larger than the accumulation gain of a still image with the smallest accumulation gain among still images already accumulated in the still image accumulating part 1-5 and about five still images immediately before the received still image have not been accumulated in the still image accumulating part 1-5. For example, when the margin of the accumulation capacity is not sufficient and the accumulation gain of the still image with the smallest accumulation gain among the still images already accumulated in the still image accumulating part 1-5 is 0.7, assuming that the result of calculation by the accumulation gain calculating part 1-2-5 received by the accumulation request receiving part 1-4-1 is as shown in FIGS. 13A and 13B, a frame number 35 first satisfies the condition, and therefore, the accumulation determining part 1-4-3 determines it is possible to accumulate. In a case where the accumulation determining part 1-4-3 determines it is possible to accumulate, information received by the accumulation request receiving part 1-4-1 (the result of calculation by the accumulation gain calculating part 1-2-5, information of a moving image including the target still image, the target still image) is accumulated into the still image accumulating part 1-5 (step A-9). At this time, when the accumulation capacity of the still image accumulating part 1-5 is not sufficient (step A-10), the accumulation determining part 1-4-3 deletes the still image with the smallest accumulation gain among the still images already accumulated in the still image accumulating part 1-5, from the still image accumulating part 1-5 (step A-11).

After the abovementioned series of processing, the analysis managing part 1-2-1 requests the still image extracting part 1-2-4 to extract a next still image, and repeatedly executes the same process until no more still image can be extracted (step A-12, A-13). In FIGS. 13A and 13B, frame numbers 40, 45, 57, 63, 68, 73, 78, 83 and 88 are accumulated in the still image accumulating part 1-5.

Figure 8:
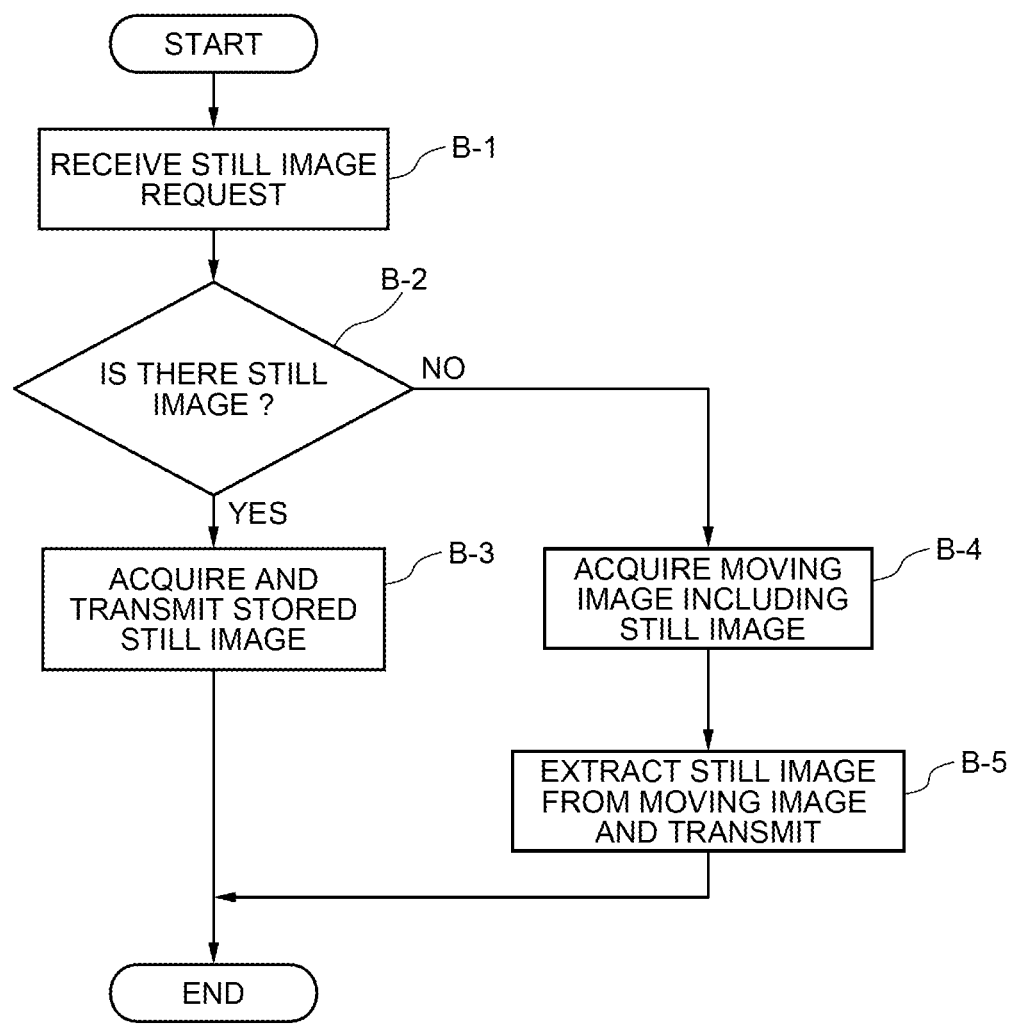
FIG. 8 is a flowchart showing the operation of the second exemplary embodiment of the present invention.

Next, referring to FIG. 8, when the request analyzing part 1-3 accepts a still image request from the still image requesting part 3-1 (step B-1), the request analyzing part 1-3 transmits the still image request to the still image request receiving part 1-4-2. The still image request transmitting part 1-4-2 searches to determine whether or not the requested still image is accumulated in the still image accumulating part 1-5 (step B-2). In a case where the requested still image is stored in the still image accumulating part 1-5, the still image request receiving part 1-4-2 extracts the still image from the still image accumulating part 1-5, and transmits the still image to the still image requesting part 3-1 through the request analyzing part 1-3 (step B5).

In a case where the requested still image is not stored in the still image accumulating part 1-5, the request analyzing part 1-3 transmits the still image request to the analysis managing part 1-2-1 through the still image request receiving part 1-2-2. The analysis managing part 1-2-1 acquires a moving image including the requested still image through the moving image acquiring part 1-2-3 (step B-4). The analysis managing part 1-2-1 uses the still image extracting part 1-2-4 to extract the requested still image from the acquired moving image (step B-5), and transmits to the still image requesting part 3-1 through the still image request receiving part 1-2-2 and the request analyzing part 1-3 (step B-5). Herein, as already described referring to FIG. 9, depending on the position of a still image in a moving image, information of a still image neighboring the target still image is needed to extract the still image. In a case where this neighboring still image can be acquired from the still image managing part 1-4, computer resources and time required for moving image analysis are reduced by acquiring the information of the neighboring still image from the still image managing part 1-4 instead of extracting the information of the neighboring still image from the moving image.

<Effect of this Exemplary Embodiment>

A first effect is that because it is possible to use still images previously accumulated with a high probability when extracting a still image from a moving image, it is possible to reduce a time required for extraction.

A second effect is that by previously extracting a still image from a moving image in a state where there is a sufficient margin of the computer resources, it is possible to level the use of the computer resources and reduce the amount of the computer resources to be prepared.

A third effect is that by previously accumulating many still images when acquiring a moving image once, the efficiency of still image extraction gets higher.

Third Exemplary Embodiment

A third exemplary embodiment of the present invention will be described using a configuration diagram.

Figure 14:
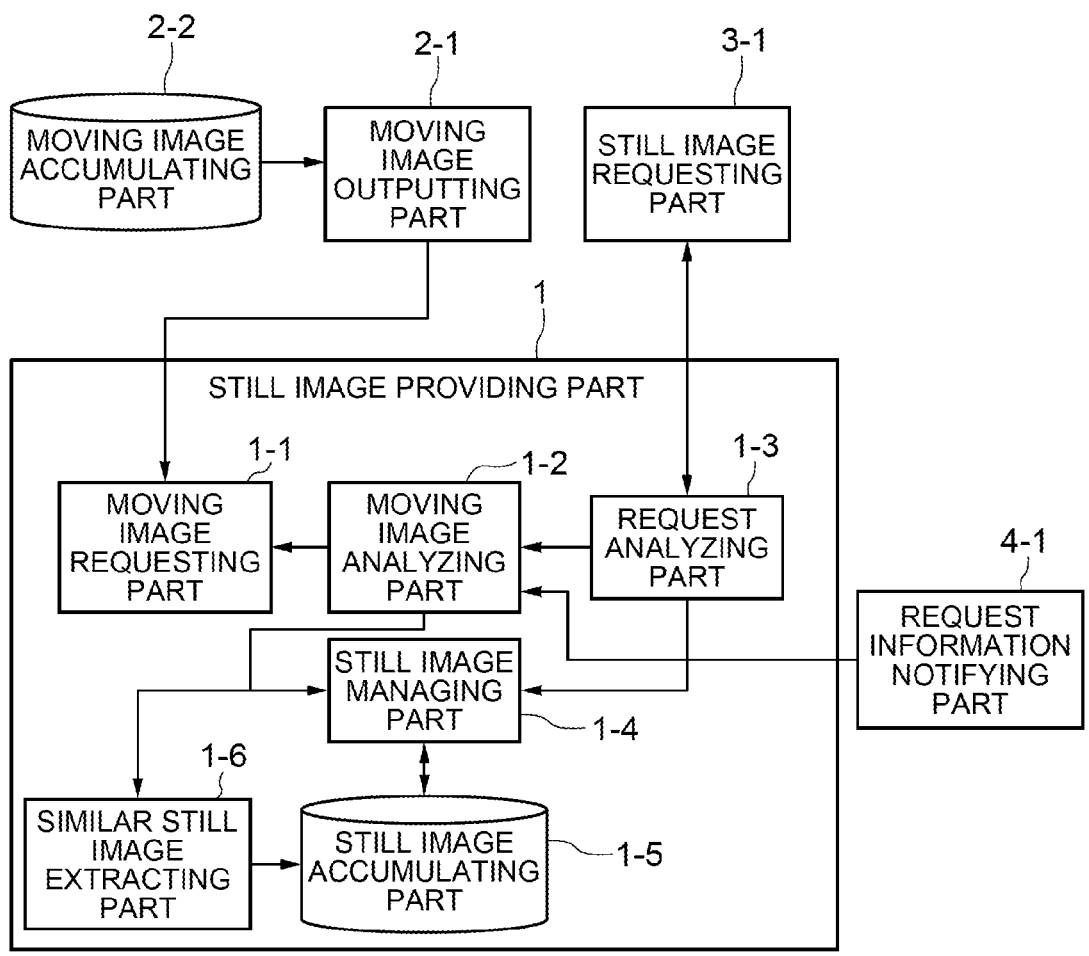
FIG. 14 is a block diagram of a third exemplary embodiment of the present invention.

As shown in FIG. 14, this exemplary embodiment is configured by adding a request information notifying part 4-1 notifying information of a still image with high probability of being requested to the second exemplary embodiment shown in FIG. 4. A still image with high probability of being requested is a still image with high probability of being requested by the still image requesting part 3-1 at a certain time of point in the future, such as a still image containing a specific person or object.

Moreover, this exemplary embodiment is configured by adding a similar still image extracting part 1-6 to the second exemplary embodiment shown in FIG. 4. The similar still image extracting part 1-6 extracts a still image with the closest moment to that of a still image requested to be extracted, from the still image accumulating part 105. Thus, it is possible to extract any still image even if a moving image cannot be acquired when there is a request for a still image.

Figure 15:
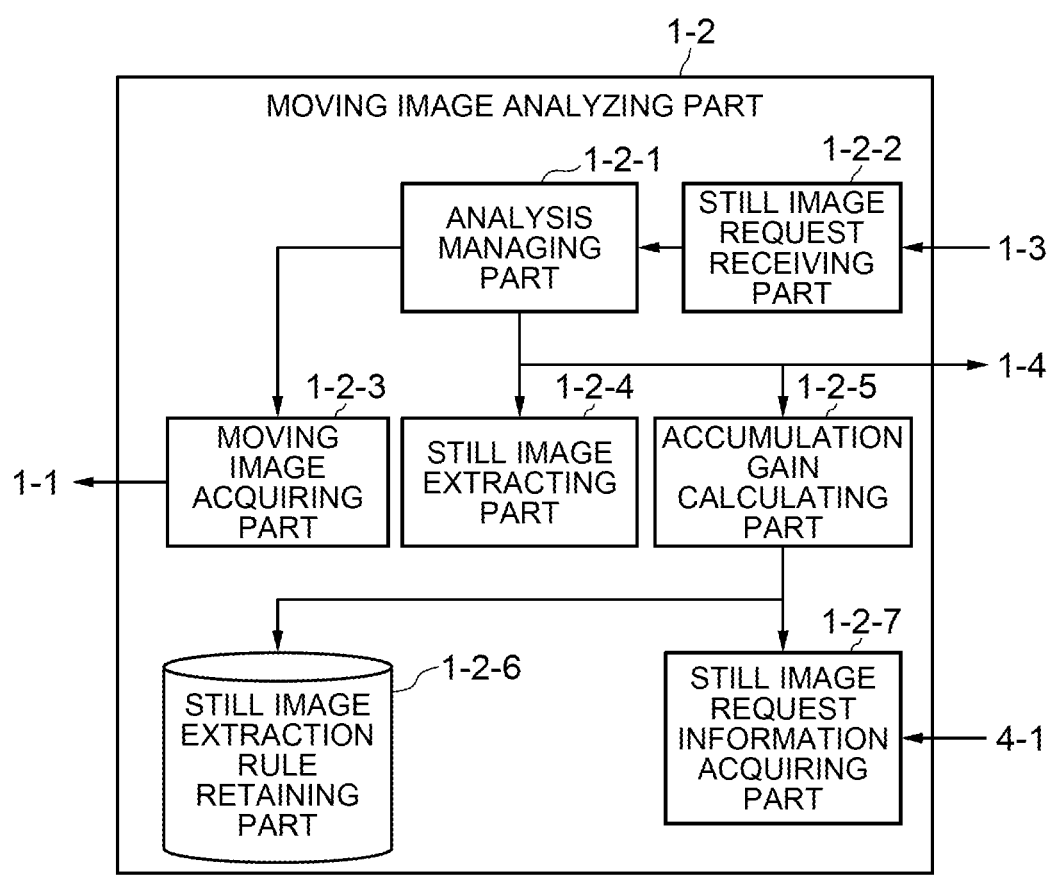
FIG. 15 is a block diagram of a moving image analyzing part in the third exemplary embodiment of the present invention.

Further, as shown in FIG. 15, the moving image analyzing part 1-2 in this exemplary embodiment has a still image extraction rule retaining part 1-2-6 and a still image request information acquiring part 1-2-7, instead of or in addition to the still image extraction cost calculating part 1-2-6, the still image quality calculating part 1-2-7, and the still image difference calculating part 1-2-8.

The still image extraction rule retaining part 1-2-6 retains an extraction rule such as, when a certain still image is stored, also storing a still image of another moving image with the same time. In this exemplary embodiment, in a case where a still image extracted by the still image extracting part 1-2-4 corresponds to a still image with high probability of being requested that can be obtained through the still image request information acquiring part 1-2-7 from the request information notifying part 4-1, the accumulation gain calculating part 1-2-5 determines that the accumulation gain is the largest. Moreover, in a case where a rule that still images extracted by the still image extracting part 1-2-4 should be accumulated is expressed in the still image extraction rule retaining part 1-2-6, the accumulation gain calculating part 1-2-5 determines that the accumulation gain is the largest. On the other hand, in a case where the above conditions are not satisfied, the accumulation gain calculating part 1-2-5 determines that the accumulation gain is the smallest.

INDUSTRIAL APPLICABILITY

It is expected to use in the fields of video monitoring, video analysis, and so on. To be specific, uses as described below are expected: extracting images in which a specific person is captured from a large number of videos of street cameras; extracting images in which a specific article is captured from a large amount of television recordings; extracting images of illegal intrusion and dumping from a large number of videos of facility monitoring cameras; and extracting images of floods and mudslides from a large number of videos of river monitoring cameras.

The whole or part of the exemplary embodiments disclosed above can be described as, but not limited to, the following supplementary notes.

[Supplementary Note 1]

A still image provision device transmitting a still image requested by a request source among a plurality of still images composing a moving image to the request source, the still image provision device including:

a moving image acquiring part configured to acquire a moving image;

a still image accumulating part configured to store still images composing the moving image;

an image processing part configured to, before request by the request source, calculate a gain of each of the still images obtained by storing the still image based on a cost of extraction of the still image from the moving image, and extract the still image with the higher gain from the moving image and store into the still image accumulating part; and a request processing part configured to retrieve the still image requested by the request source from the still image accumulating part and transmit to the request source and, in a case where the still image requested by the request source is not stored in the still image accumulating part, extract the still image requested by the request source from the moving image acquired by the moving image acquiring part and transmit to the request source.

[Supplementary Note 2]

The still image provision device according to Supplementary Note 1, wherein the image processing part is configured to calculate the gain of the still image based on a quality of the still image in addition to the cost.

[Supplementary Note 3]

The still image provision device according to Supplementary Note 1, wherein the image processing part is configured to calculate the gain of the still image based on an amount of a difference between the still image and another of the still images in addition to the cost.

[Supplementary Note 4]

The still image provision device according to Supplementary Note 1, wherein the image processing part is configured to extract the still image whose gain exceeds a given value from the moving image and store into the still image accumulating part.

[Supplementary Note 5]

The still image provision device according to Supplementary Note 1, wherein:

the still image accumulating part is configured to store the gains of the still images that the still image accumulating part stores; and the image processing part is configured to, in a case where a free space of the still image accumulating part is equal to or less than a given value, before storing a new one of the still images into the still image accumulating part, compare the gain of the new still image with a minimum one of the gains stored in the still image accumulating part and, only when the gain of the new still image is larger than the minimum gain, store the new still image and the gain of the new still image into the still image accumulating part and delete the still image with the smallest gain from the still image accumulating part.

[Supplementary Note 6]

A still image provision method executed by a still image provision device having a still image accumulating part configured to store still images and transmitting a still image requested by a request source among a plurality of still images composing a moving image to the request source, the still image provision method including:

before request by the request source, calculating a gain obtained by previously storing the still image based on a cost of extraction of the still image from the moving image, and extracting the still image with the higher gain from the moving image and storing into the still image accumulating part; and retrieving the still image requested by the request source from the still image accumulating part and transmitting to the request source and, in a case where the still image requested by the request source is not stored in the still image accumulating part, extracting the still image requested by the request source from the moving image including the still image and transmitting to the request source.

[Supplementary Note 7]

The still image provision method according to Supplementary Note 6, including:

in the calculating the gain, calculating the gain of the still image based on a quality of the still image in addition to the cost.

[Supplementary Note 8]

The still image provision method according to Supplementary Note 6, including:

in the calculating the gain, calculating the gain of the still image based on an amount of a difference between the still image and another of the still images in addition to the cost.

[Supplementary Note 9]

The still image provision method according to Supplementary Note 6, including:

in the storing, extracting the still image whose gain exceeds a given value from the moving image and storing into the still image accumulating part.

[Supplementary Note 10]

The still image provision method according to Supplementary Note 6, wherein the still image accumulating part is configured to store the gains of the still images that the still image accumulating part stores, the still image provision method including:

in a case where a free space of the still image accumulating part is equal to or less than a given value, before storing a new one of the still images into the still image accumulating part, comparing the gain of the new still image with a minimum one of the gains stored in the still image accumulating part and, only when the gain of the new still image is larger than the minimum gain, storing the new still image and the gain of the new still image into the still image accumulating part and deleting the still image with the smallest gain from the still image accumulating part.

[Supplementary Note 11]

A non-transitory computer-readable medium storing a program comprising instructions for causing a computer, which has a still image accumulating part configured to store still images and transmits a still image requested by a request source among a plurality of still images composing a moving image to the request source, to function as:

a moving image acquiring part configured to acquire a moving image;

an image processing part configured to, before request by the request source, calculate a gain obtained by previously storing the still image based on a cost of extraction of the still image from the moving image, and extract the still image with the higher gain among the plurality of still images composing the moving image, from the moving image, and store into the still image accumulating part; and a request processing part configured to retrieve the still image requested by the request source from the still image accumulating part and transmit to the request source and, in a case where the still image requested by the request source is not stored in the still image accumulating part, extract the still image requested by the request source from the moving image acquired by the moving image acquiring part and transmit to the request source.

[Supplementary Note 12]

The non-transitory computer-readable medium according to Supplementary Note 11, wherein the image processing part is configured to calculate the gain of the still image based on a quality of the still image in addition to the cost.

[Supplementary Note 13]

The non-transitory computer-readable medium according to Supplementary Note 11, wherein the image processing part is configured to calculate the gain of the still image based on an amount of a difference between the still image and another of the still images in addition to the cost.

[Supplementary Note 14]

The non-transitory computer-readable medium according to Supplementary Note 11, wherein the image processing part is configured to extract the still image whose gain exceeds a given value from the moving image and store into the still image accumulating part.

[Supplementary Note 15]

The non-transitory computer-readable medium according to Supplementary Note 11, wherein:

the still image accumulating part is configured to store the gains of the still images that the still image accumulating part stores; and the image processing part is configured to, in a case where a free space of the still image accumulating part is equal to or less than a given value, before storing a new one of the still images into the still image accumulating part, compare the gain of the new still image with a minimum one of the gains stored in the still image accumulating part and, only when the gain of the new still image is larger than the minimum gain, store the new still image and the gain of the new still image into the still image accumulating part and delete the still image with the smallest gain from the still image accumulating part.

[Supplementary Note 16]

A still image provision system comprising:

the still image provision device according to any of Supplementary Notes 1 to 5;

a moving image accumulating part configured to store the moving image;

a moving image outputting part configured to provide the still image provision device with the moving image stored by the moving image accumulating part; and a still image requesting part configured to make a request for a still image to the still image provision device.

[Supplementary Note 17]

A still image provision method executed by a still image provision system including a moving image accumulation device, a moving image output device, a still image request device, and a still image provision device having a still image accumulating part, the still image provision method comprising:

by the moving image output device, transmitting a moving image stored in the moving image accumulation device to the still image provision device;

by the still image provision device, acquiring the moving image from the moving image output device, calculating a gain obtained by previously storing based on a cost of extraction of a still image from the moving image and, from among a plurality of still images composing the moving image extracting, extracting some still images with the higher gains and storing into the still image accumulating part;

by the still image request device, making a request for the still image to the still image provision device; and by the still image provision device, retrieving the still image requested by the still image request device from the still image accumulating part and transmitting to a source of the request and, in a case where the still image requested by the still image request device is not stored in the still image accumulating part, acquiring the moving image including the still image requested by the still image request device from the moving image accumulation device through the moving image output device, and extracting the still image from the acquired moving image and transmitting to the still image request device.

The invention claimed is:

1. A still image provision device for transmitting a still image that is requested by a request source to the request source, where the still image is among a plurality of still images that compose a moving image, the still image provision device comprising:

a computer device equipped with a communications interface and a memory that has software encoded therein that, upon execution by the computer, causes the computer to function as:

a moving image acquiring part configured to acquire the moving image;

a still image accumulating part configured to store one or more still images that compose the moving image;

an image processing part configured to, before request by the request source,
    calculate, for each of the still images of the acquired moving image, a cost representing an amount of calculation required by the computer device for extraction thereof from the acquired moving image,
    calculate a gain for each of the still images based on at least the calculated costs, and
    extract and store into the still image accumulating part a still image from the acquired moving image that has a higher calculated gain; and
a request processing part configured to retrieve the requested still image requested by the request source,
wherein, in a case where the requested still image is already stored in the still image accumulating part, the request processing part transmits the still image already stored in the still image accumulating part to the request source and, in a case where the requested still image is not stored in the still image accumulating part, the request processing part extracts the requested still image from the acquired moving image and transmits the extracted requested still image to the request source.

2. The still image provision device according to claim 1, wherein the image processing part is configured to calculate the gain of the still image based on both of the calculated cost and a quality of the still image.

3. The still image provision device according to claim 1, wherein the image processing part is configured to calculate the gain of the still image based on both of the calculated cost and an amount of a difference between the still image and another of the still images.

4. The still image provision device according to claim 1, wherein the image processing part is configured to extract from the moving image, and store into the still image accumulating part, a still image for which a calculated gain exceeds a given amount determined in advance fc-he.

5. The still image provision device according to claim 1, wherein: the still image accumulating part is configured to store the calculated gains of the still images stored by the still image accumulating part; and the image processing part is configured to, in a case where a free space of the still image accumulating part is equal to or less than a given amount determined in, before storing a new one of the still images into the still image accumulating part, compare a gain of the new still image with a minimum one of the gains stored in the still image accumulating part and, only when the gain of the new still image is larger than the minimum gain, store the new still image and the gain of the new still image into the still image accumulating part and delete a still image with a smallest gain from the still image accumulating part.

6. A still image provision method to be executed by a still image provision device comprised of a computer device equipped with a communications interface and a memory that has software encoded therein that, upon execution by the computer device, causes the computer to function as a still image accumulating part, that stores still images of a moving image, and a request processing part that transmits a requested still image of said still images to a request source upon receiving a request from the request source, the still image provision method comprising:
    before request by the request source,
        calculating, at the computer device, a cost representing an amount of calculation required by the computer device for extraction of each of the still images from the moving image,
        calculating, at the computer device, a gain for each of the still images based on at least the calculated costs of the still images, and
        extracting and storing, at the computer device, a still image with a higher gain into the still image accumulating part; and
    after request by the request source, retrieving, at the computer device, the requested still image requested by the request source,
    wherein, in a case where the requested still image is already stored in the still image accumulating part, the request processing part transmits the still image already stored in the still image accumulating part to the request source, and
    wherein, in a case where the requested still image is not stored in the still image accumulating part, the request processing part extracts the requested still image from the moving image and transmits the extracted still image to the request source.

7. The still image provision method according to claim 6, wherein, in the calculating of the gain, the gain of the still image is calculated based on the calculated cost and on a quality of the still image.

8. The still image provision method according to claim 6, wherein, in the calculating of the gain, the gain of the still image is calculated based on the calculated cost and on an amount of a difference between the still image and another of the still images.

9. The still image provision method according to claim 6, wherein, in the extracting and storing of the still image, the still image is extracted and stored whose gain exceeds a given amount determined in tie fc-he.

10. The still image provision method according to claim 6, further comprising: storing the gains of the still images that are stored by the still image accumulating part, wherein:
in a case where a free space of the still image accumulating part is equal to or less than a given amount determined in, before storing a new one of the still images into the still image accumulating part, comparing a gain of the new still image with a minimum one of the gains stored in the still image accumulating part and, only when the gain of the new still image is larger than the minimum gain, storing the new still image and the gain of the new still image into the still image accumulating part and deleting a still image with a smallest gain from the still image accumulating part.

11. A non-transitory computer-readable medium storing a program comprising instructions for causing a computer, equipped with a memory, a still image accumulating part configured to store still images and a communications interface, to function as:
    a moving image acquiring part configured to acquire a moving image composed of a plurality of still images;
    an image processing part configured to, prior to receiving a request from a request source,
        calculate, for each one of the plurality of still images of the acquired moving image, a cost representing an amount of processing required by the computer to extract the still image from the acquired moving image,
        calculate a gain, for each of the still images, that is based on at least the calculated costs, and
        extract and store a still image with a higher gain into the still image accumulating part; and a request processing part configured to retrieve, after receiving the request from the request source, a still image requested by the request source and to transmit the requested still image to the request source, wherein, in a case where the requested still image is already stored in the still image accumulating part, the request processing part transmits the still image already stored in the still image accumulating part to the request source, and wherein, in a case where the requested still image is not stored in the still image accumulating part, the request processing part extracts the requested still image from the moving image and for transmission to the request source.

12. The non-transitory computer-readable medium according to claim 11, wherein the image processing part is configured to calculate the gain of the still image based on the calculated cost and a quality of the still image.

13. The non-transitory computer-readable medium according to claim 11, wherein the image processing part is configured to calculate the gain of the still image based on the calculated cost and an amount of a difference between the still image and another of the still images.

14. The non-transitory computer-readable medium according to claim 11, wherein the image processing part is configured to extract from the moving image, and store into the still image accumulating part, a still image for which a calculated gain exceeds a given amount determined tie.

15. The non-transitory computer-readable medium according to claim 11, wherein: the still image accumulating part is configured to store the calculated gains of the still images stored by the still image accumulating part; and the image processing part is configured to, in a case where a free space of the still image accumulating part is equal to or less than a given amount determined in, before storing a new one of the still images into the still image accumulating part, compare a gain of the new still image with a minimum one of the gains stored in the still image accumulating part and, only when the gain of the new still image is larger than the minimum gain, store the new still image and the gain of the new still image into the still image accumulating part and delete a still image with a smallest gain from the still image accumulating part.

16. The still image provision device according to claim 1, wherein the gain is an index value for determining whether or not to store the still image.

17. The still image provision method according to claim 6, wherein the gain is an index value for determining whether or not to store the still image.

18. The non-transitory computer-readable medium according to claim 11, wherein the gain is an index value for determining whether or not to store the still image.

19. The still image provision device according to claim 1, wherein the cost represents a computer resource and time required for extraction by using the computer.

* * * * *